United States Patent [19]

Terpstra

[11] Patent Number: 5,738,483
[45] Date of Patent: Apr. 14, 1998

[54] LIFT AND INVERT MECHANISM

[75] Inventor: Paul D. Terpstra, Janesville, Wis.

[73] Assignee: Giddings & Lewis, Inc., Fond du Lac, Wis.

[21] Appl. No.: 711,469

[22] Filed: Sep. 11, 1996

[51] Int. Cl.⁶ ........................................ B25B 11/00
[52] U.S. Cl. ........................ 414/758; 414/779; 414/782
[58] Field of Search ...................... 198/402; 414/728, 414/758, 772, 779, 782, 783

[56] References Cited

U.S. PATENT DOCUMENTS

| | | | |
|---|---|---|---|
| 1,470,533 | 10/1923 | Johnston . | |
| 2,776,831 | 1/1957 | Shields . | |
| 3,302,768 | 2/1967 | Cooper . | |
| 4,220,239 | 9/1980 | Prichard, Jr. | 198/403 |
| 4,715,775 | 12/1987 | Amino | 414/758 |
| 4,784,558 | 11/1988 | Toriyama . | |
| 4,921,387 | 5/1990 | Bennington | 414/225 |
| 5,141,388 | 8/1992 | Georgitsis et al. | 414/783 |
| 5,358,372 | 10/1994 | Meredith | 414/778 |
| 5,395,205 | 3/1995 | Dugas et al. | 414/728 |

*Primary Examiner*—David A. Bucci
*Assistant Examiner*—Janice L. Krizek
*Attorney, Agent, or Firm*—Foley & Lardner

[57] ABSTRACT

A mechanism for lifting from an operating position, inverting, and returning to the operating position a workpiece. The mechanism includes two drive devices, a linear drive which provides a continuous lifting force to a vertically movable member, and rotary drive which is energized to lift, invert, and lower a workpiece. The vertically movable member carries a rotational support member, which includes a rotatable shaft from which is supported the workpiece. The vertically movable member is raised, rotated and lowered by the rotary drive through a pair of levers, a first one of which is connected to rotate with the rotatable shaft and the second one of which is connected to be rotated by the rotary drive. Rotation of the second lever is imparted to the first lever through a cam and cam follower arrangement, the cam being provided on one of the levers and the cam follower on the other lever.

19 Claims, 4 Drawing Sheets

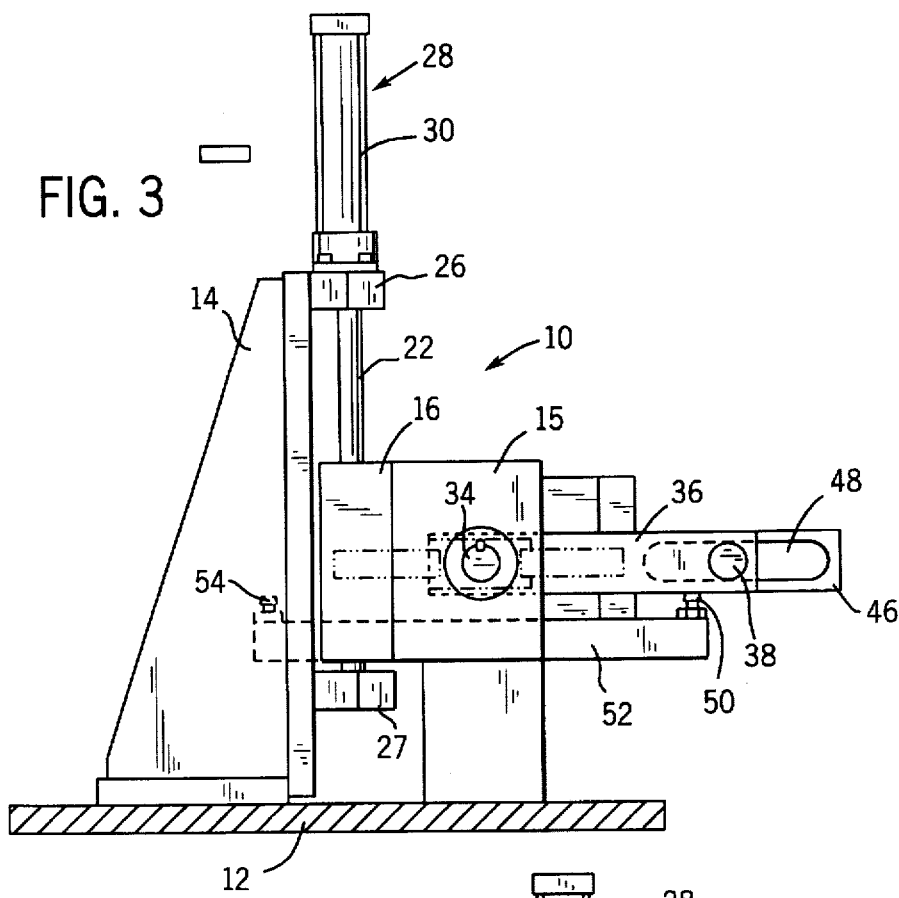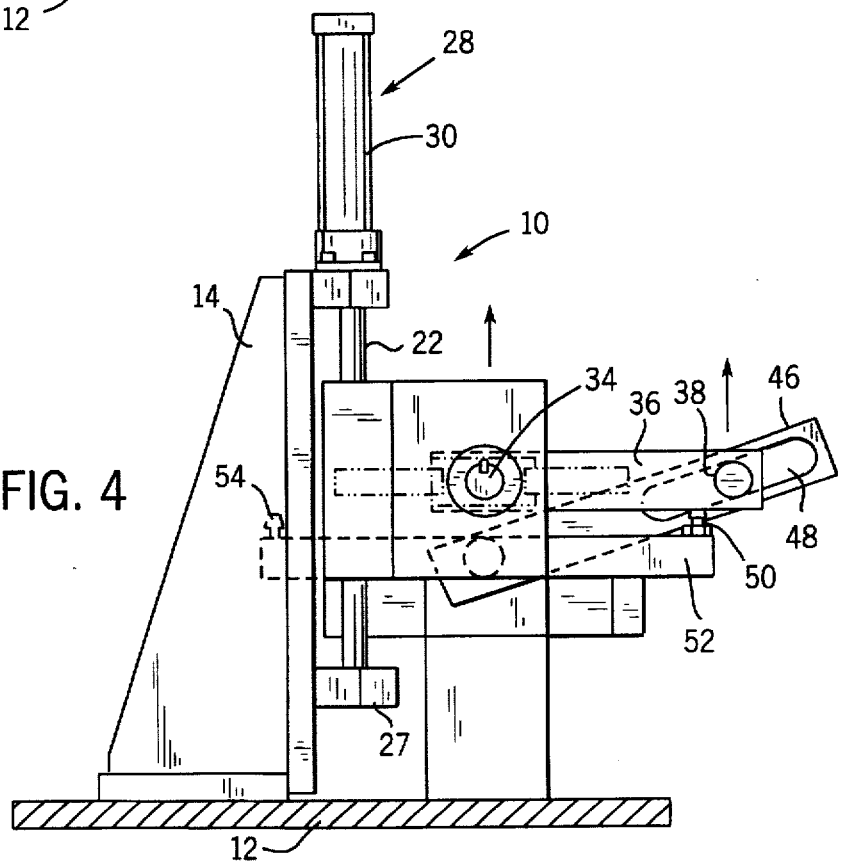

LIFT AND INVERT MECHANISM

FIELD OF THE INVENTION

This invention relates to a lift and invert mechanism particularly useful for handling a workpiece in an automated manufacturing system. In automated manufacturing systems it is frequently desirable to perform multiple operations on opposite sides of the workpiece by tools located above the workpiece. In such cases, it is first necessary to lift the workpiece in order to provide clearance for inverting the workpiece, after which the workpiece is lowered for performing an operation on the opposite side.

BACKGROUND OF THE INVENTION

Typically, currently available mechanisms for rotating a workpiece use an air-operated rotary actuator mounted on an air operated vertical slide. After the workpiece is engaged by a mechanical gripper, a first valve is actuated to cause the vertical slide to lift the workpiece. When a first sensor indicates that the vertical slide is at the desired raised position, a second valve is actuated to cause the rotary actuator to rotate, thereby inverting the workpiece. When a second sensor indicates that the rotation of the workpiece has been completed, the first valve is again actuated to cause the vertical slide to be lowered. When a third sensor indicates that the vertical slide is in its lowered position, the workpiece is released. A fourth sensor is provided to indicate rotation of the workpiece has been completed in the direction opposite that sensed by the second sensor. Thus, the typical currently available mechanism for inverting a workpiece requires two valves and four sensors.

SUMMARY OF THE INVENTION

It is an object of this invention to provide a mechanism for lifting and inverting a workpiece which has a simplified controlled system as compared to the prior art. It is another object of this invention to provide an improved mechanism for lifting and inverting a workpiece. The improved mechanism requires only two drive devices, e.g., pneumatic actuators, and a single controller or valve that, in turn, is controlled by only two position sensors.

In accordance with this invention a mechanism for lifting and inverting a workpiece is provided, in which a vertically movable member is movable between a lower or operating position and an upper or raised position for rotation. A first linear pneumatic drive device, which in the preferred embodiment is a pneumatic cylinder, serves as an air spring, with the pneumatic spring force tending to lift the vertically movable member. A rotatable member is horizontally supported on the vertically movable member. A mechanism is provided on the rotatable horizontal member for holding a workpiece which is to be rotated. A first lever arm extending radially from the horizontal rotatable member has a cam follower formed therein. A second lever arm has an elongated slot formed therein which receives the cam follower and is caused to rotate by a second rotational drive device, which in the preferred embodiment is also a pneumatic drive.

To cause lifting, rotation and lowering of the workpiece, the linear and rotational drive devices are energized, preferably with compressed air, to cause the vertically movable member to be lifted while the cam follower moves within the slot of the second lever arm as the second lever arm is rotated. When the vertical support member reaches its fully raised position, continued rotation of the second lever arm causes continued rotation of the first lever arm and the workpiece through approximately 180 degrees. Thereafter, the vertical movable support member, with the workpiece inverted, is driven downward to its original lower or operating position, against the upward pneumatic spring force of the linear drive device, by the continued rotation of the second lever arm.

When the rotational pneumatic drive device is again supplied with compressed air, so as to cause the vertically movable support member to be lifted, the lever arms will rotate in the opposite direction, to again turn the workpiece approximately 180 degrees. The vertical movable support member is again driven by the continued rotation of the second lever arm to its original lower or operating position with the workpiece again inverted.

BRIEF DESCRIPTION OF THE DRAWINGS

In the following figures, like reference numerals are used to identify like elements.

FIG. 3 is a side view taken from the left in FIG. 1 of the mechanism;

FIG. 4 is a side view, similar to that of FIG. 3, showing the mechanism in a first stage of lifting a workpiece;

DETAILED DESCRIPTION OF THE PREFERRED EMBODIMENT

Figure 1:
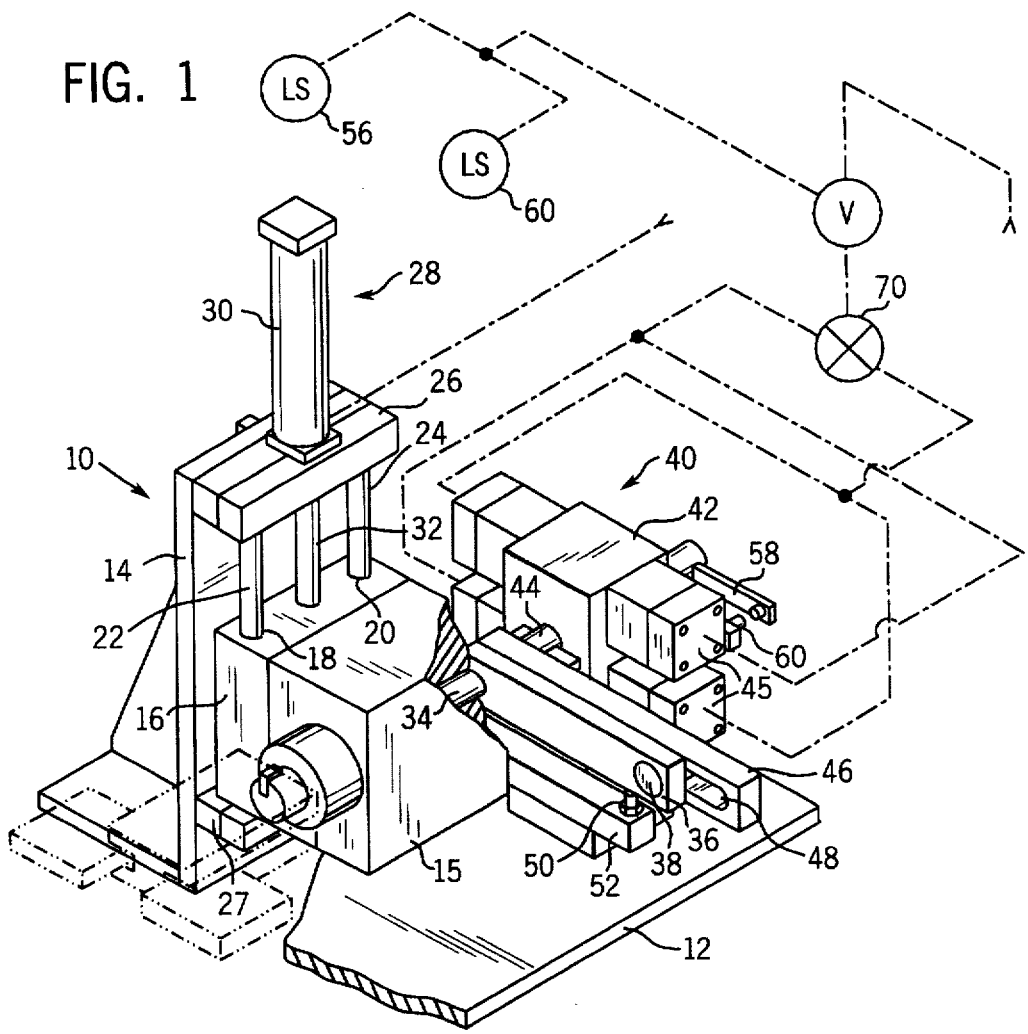
FIG. 1 is a perspective view of a mechanism in accordance with a preferred embodiment of this invention for lifting, inverting and returning a workpiece to its original location after it has been inverted.

Referring to FIG. 1, a mechanism for lifting and rotating a workpiece in accordance with this invention will be described. The inverting and lifting mechanism 10 of this invention includes a base 12, and a vertical fixed support member 14. A rotational support member 15 is mounted to a vertically movable member 16 which is provided with holes 18 and 20 which receive vertical guide rods 22 and 24 which extend between two fixed support members 26 and 27 which are secured to the vertical fixed support member 14. A first drive device is a linear drive device 28 supported on the upper fixed support member 26. The first linear drive device 28 is shown as a pneumatic cylinder 30, with a drive rod 32 connected to a piston (not shown) within the cylinder 30 to be moved therewith. The drive rod 32 is secured to the vertically movable member 16 for movement therewith. The first linear drive device 28 serves as an air spring, with drive rod 32 applying an upward force to vertically movable member 16. Rotatably supported in a horizontal hole in the support member 15 is a horizontal rotatable member or shaft 34. Connected to the right end of shaft 34 is a first lever arm 36. The second or free end of the lever arm 36 supports a cam follower, shown as a pin 38.

Supported on the base 12 to the right of the right end of the shaft 34 is a stationary support or housing 40 supporting a second drive device which is a pneumatic rotational drive device 42. The second rotational drive device includes pneumatic cylinders located above and below a horizontal output shaft 44, with portions 45 extending from the housing 40 as shown. Operating elements of the second rotational drive device 42 are connected to cause rotation of the output shaft 44. Connected to the left end of output shaft 44, as shown in FIG. 1, is a second lever arm 46 having a cam, in the form of an elongated slot 48, formed therein. The first lever arm 36 and the second lever arm 46 are positioned such that the cam follower, shown as pin 38 is received in the cam or elongated slot 48.

A first adjustable stop 50 is supported on an arm 52 carried by the support member 15 to provide a limit on rotation of the shaft 34 and first lever arm 36, in the clockwise direction as viewed in FIG. 1, to a horizontal position. A second adjustable stop 54 is supported on the opposite end of arm 52, as shown in FIGS. 3–7, to limit the rotation of the shaft 34 and first lever arm 36, in the counterclockwise direction, as viewed in FIG. 1, to a horizontal position.

Figure 7:
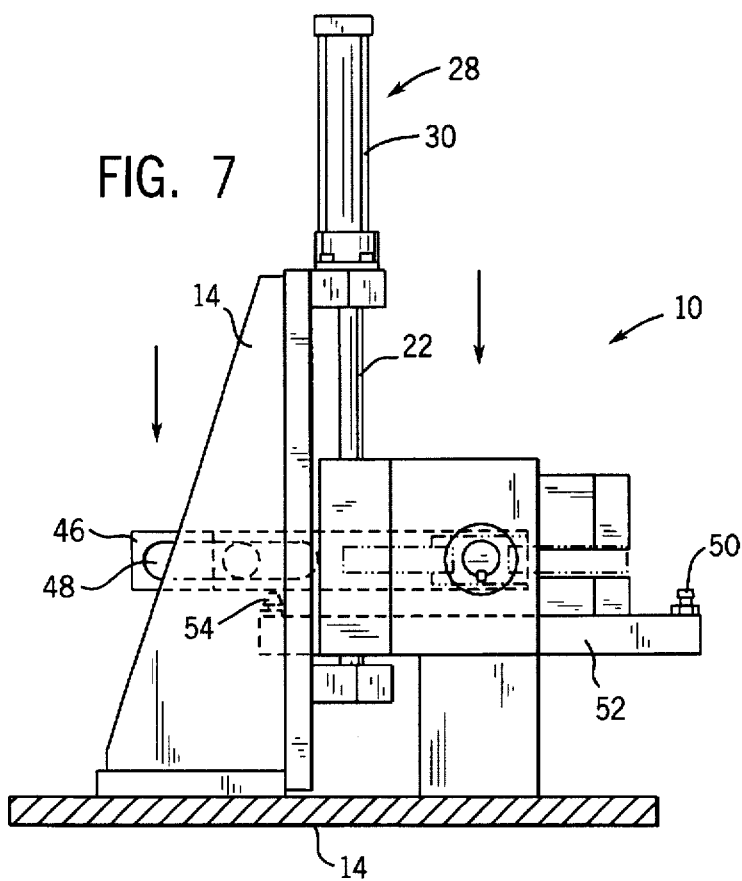
FIG. 7 is a side view similar to that of FIG. 3, showing the position of the mechanism after returning a workpiece to its lowered position; and, FIG. 8 is a cross-sectional view taken generally along the line 8—8 in FIG. 2.
Figure 8:
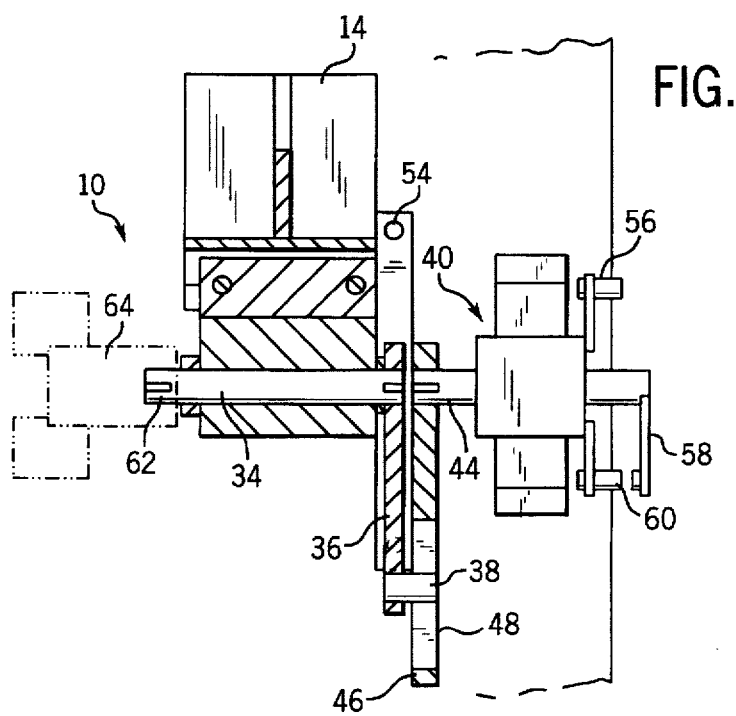

Rotation of shaft 34 in a counterclockwise direction to the position shown in FIG. 7, wherein arm 36 engages stop 54, is sensed by a first sensor 56, which is mounted on stationary support 40. For instance, first sensor 56 may include a proximity switch, which senses the position of an arm 58 secured to the shaft 44. Similarly, rotation of shaft 44 in a clockwise direction to the position shown in FIGS. 3 and 8, wherein arm 36 engages stop 50, is sensed by a second sensor 60 mounted on stationary support 40. Again, second sensor 60 may include a proximity switch, which senses the position of arm 58 secured to shaft 44.

Figure 2:
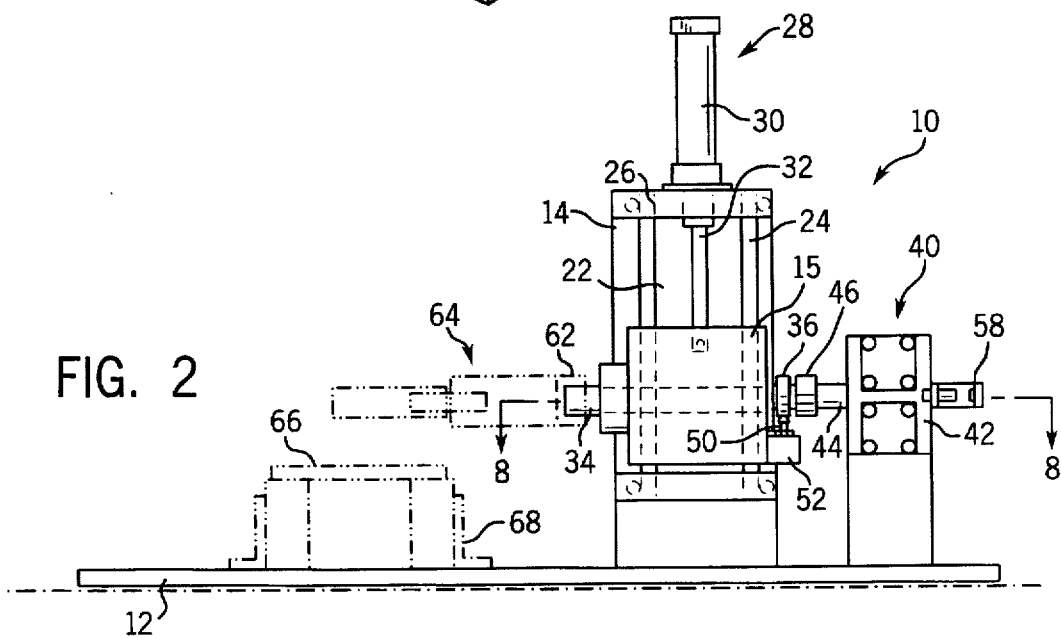
FIG. 2 is a front view of the lifting, inverting and lowering mechanism shown in FIG. 1.

As shown in FIG. 2 by dashed lines, a coupling mechanism 62 is provided on the left end of the shaft 34 as viewed in FIG. 1 for supporting a mechanism 64 for holding and supporting a workpiece which is to be inverted over a workstation represented by a fixture 66 and a conveyor 68.

Referring to FIGS. 3 through 8, the operation of the mechanism for lifting and inverting a workpiece in accordance with this invention will be described. In FIG. 3, the mechanism 10 is shown in an initial lower position with the first and second lever arms 36 and 46 extending to the right as shown in FIG. 1. The vertical drive device 28 is energized, so as to apply an upward force through rod 32 to the support member 15. The lever arm 48 is rotated in the counterclockwise direction upon energization of the second rotational drive device 42. The drive device 28 is energized by operating the valve V to supply it with compressed air. The upward movement of support member 15, causes the center of shaft 34 to rise above the center of shaft 44 as viewed in FIG. 4. This in turn causes the cam follower or pin 38 to move within the cam or elongated slot 48 in second lever arm 46.

Figure 5:
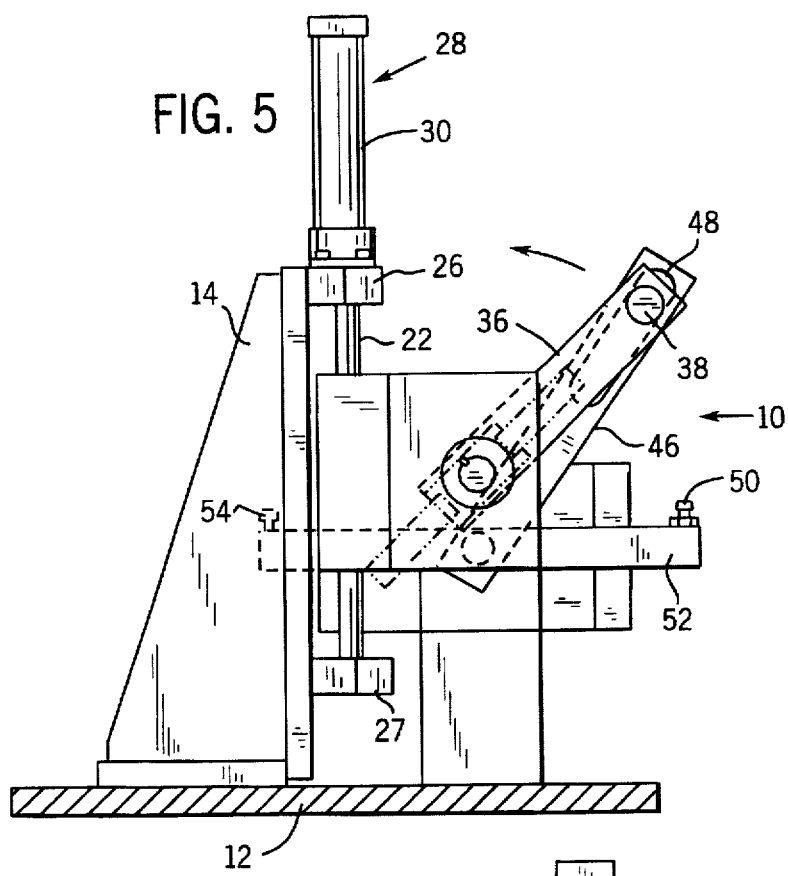
FIG. 5 is a side view similar to that of FIG. 3 showing the mechanism in a second stage of lifting and inverting a workpiece.
Figure 6:
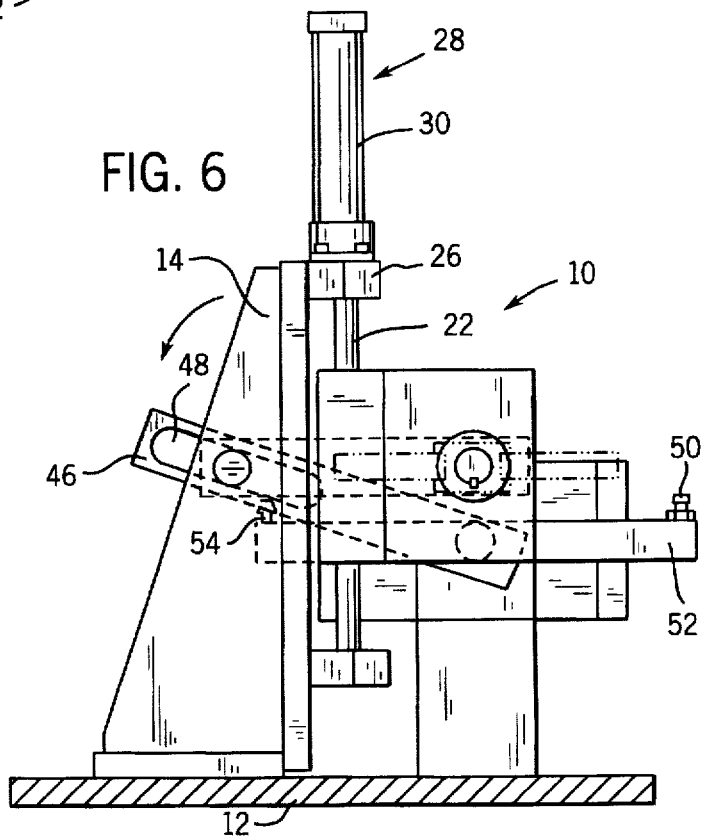
FIG. 6 is a side view similar to that of FIG. 3 showing the position of the mechanism after the inverting of the workpiece has been completed.

When the support member 15 reaches its uppermost position as shown in FIG. 5, continued rotation of the second lever arm 46 by the second rotational drive device 42 causes rotation of the first lever arm 36 due to the engagement of the pin 38 in the slot 48. The continued energization of the second rotational drive device 42 will cause the continued counterclockwise rotation of lever arms 36 and 46 until first lever arm 36 reaches the horizontal position, extending to the left, as shown in FIG. 6, wherein it is in engagement with stop 54. Continued rotation of arm 46 will cause the support member 15 to move downward, against the lifting force of vertical drive device 28, until it reaches its lower position in engagement with fixed support member 27.

In one possible sequence of operations, with the mechanism in the position shown in FIG. 7, a first workpiece would be removed, and a second workpiece brought into place and secured by mechanism 64. The second rotational drive device 42 is again energized. The continued energization of the linear drive device 28, and the energization of rotational drive device 42, will cause the lever arms 36 and 46 to be rotate in the opposite or clockwise direction. After the vertically movable member 16 reaches its uppermost position, with the lever arm 36 rotated to a horizontal position in engagement with stop 50, continued clockwise rotation of lever arm 46 will cause the vertically movable member 16 to be moved downward, overcoming the upward pneumatic spring force of linear drive device 28. When the lever arm 46 has rotated to the horizontal position shown in FIGS. 1 and 3, the output shaft 44 will have rotated to the position shown in FIG. 8, such that proximity switch 60 will sense the position of arm 58. The second workpiece would then be removed, and a third workpiece secured in its place. The same work would then be completed on the third workpiece as was just completed on the first workpiece. Each time the valve V is operated to supply air to the rotational drive device 42, the diverter valve 70 is actuated to supply compressed air to the alternate pair of pneumatic cylinders of the second rotational drive device 42 so as to provide rotation of shaft 44 in the opposite direction to its previous rotation.

Thus, only two sensors 56 and 60 are required to control the operation of the lift and invert mechanism of this invention. That is, with the vertically movable member in its lowered position with a first side of the workpiece facing upward, it is only necessary to supply energy to rotational drive device 42 to begin a lifting and inverting operation. After the arm 36 has been rotated 180 degrees, and the vertically movable member 16 returned to its lower position, the appropriate one of the sensors 56 or 60 will be actuated. Upon again energizing the rotational drive device 42, the vertically movable member 16 will be lifted, the workpiece rotated 180 degrees, and returned to its lowered position. Thus, in accordance with this invention a workpiece can be lifted so as to be inverted, that is rotated 180 degrees, and lowered upside down to its original position, utilizing only two drive devices and two sensors and a single controller or valve responsive to the output of the sensors.

In describing the preferred embodiment of this invention, the two drive devices have been presented as pneumatic operators. However, other types of operators could be utilized such as electrically energized solenoids and hydraulic operators.

While only one embodiment of the invention has been shown, it should be apparent to those skilled in the art that what has been described is considered at present to be a preferred embodiment of the lift and invert mechanism of this invention. In accordance with the Patent Statute, changes may be made in the lift and invert mechanism without actually departing from the true spirit and scope of this invention. The appended claims are intended to cover all such changes and modification which fall in the true spirit and scope of this invention.

What is claimed is:

1. A mechanical system for lifting a workpiece from an operating position, inverting the workpiece, and returning it to an inverted operating position, comprising:

a vertically moveable support member, moveable between a lower operating position and a raised position, a horizontal shaft rotatably supported by said vertically moveable support member, the workpiece being supported by said horizontal shaft, a first drive device for urging said vertically moveable support member from the lower operating position to the raised position, a first lever arm having first and second ends, said first lever arm secured adjacent said first end to said horizontal shaft for rotation thereof, a second lever arm having first and second ends, said second lever arm coupled to said first lever arm, a second drive device for rotating said second lever arm about its first end, and an energy control device for controlling the supply of energy to said second drive device, the supply of energy to said second drive device causing said second lever arm to be rotated, thereby causing said first lever arm to be rotated, so as to raise, invert, and lower the workpiece.

2. The mechanical system of claim 1, wherein a second shaft is rotated by said second drive device, and wherein said second lever arm is secured to said second shaft for rotation therewith.

3. The mechanical system of claim 2, wherein said horizontal shaft and said second shaft are substantially axially aligned when said vertically moveable member is in the lower operating position.

4. The mechanical system of claim 2, wherein a pair of sensors are provided to detect rotation of said second shaft, and wherein the outputs of said sensors are used to cause the termination of the supply of energy to said second drive device when said first lever arm has been rotated approximately 180 degrees.

5. The mechanical system of claim 1, wherein said second lever arm is coupled to said first lever arm using a cam and cam follower arrangement.

6. The mechanical system of claim 5, wherein said cam and cam follower arrangement includes a pin supported on said first lever arm and a slot disposed in said second lever arm, with said pin being engaged in said slot.

7. The mechanical system of claim 1, wherein said first drive device and said second drive device are both pneumatic drive devices.

8. The mechanical system of claim 1, wherein adjustable stops are provided to limit the rotation of the horizontal shaft.

9. The mechanical system of claim 1, wherein each time said second drive device is supplied with energy, said second drive device rotates in the opposite direction from the previous rotation.

10. The mechanical system of claim 1, wherein said energy control device is a single valve.

11. A mechanism for lifting a workpiece from an operating position, inverting the workpiece, and returning it to an inverted operating position, comprising:

a vertically moveable support member, moveable between a lower operating position and a raised position, a horizontal shaft rotatably supported by said vertically moveable support member, the workpiece being supported by said horizontal shaft, a first device urging said vertically moveable support member from the lower operating position to the raised position, a first lever arm having first and second ends, said first lever arm secured adjacent said first end to said horizontal shaft for rotation thereof, and supporting a first cam follower device adjacent said second end, a second lever arm having first and second ends, a second device rotating said second lever arm, said first end of said second lever arm secured to said second device to be rotated thereby, said second lever arm having a second cam follower device adjacent said second end, said first cam follower device engaging said second cam follower device such that when a supply of energy to said second device causes said second lever arm to be rotated, the engagement of said first and second cam follower devices causes said first lever arm to be rotated by the rotation of said second lever arm, so as to raise, invert, and lower the workpiece.

12. The mechanism of claim 11, wherein said second cam follower device is a slot in said second lever arm, and wherein said first cam follower device is a pin supported on said first lever arm, with said pin being engaged in said slot.

13. A mechanism for manipulating a workpiece between upright and inverted positions, comprising:

a support member that is moveable along a path between a first position and a second position, a shaft rotatably supported by said support member, said shaft being configured to support the workpiece, means connected to said support member for urging said support member from said first to said second position, a first lever arm having first and second ends, said first end being coupled to said shaft for rotation thereof, a rotational drive device, a second lever arm having first and second ends, said first end of said second lever arm being coupled to said rotational drive device to be rotated thereby, and means for slidably engaging said first lever arm second end with said second lever arm second end such that as said support member is urged from said first position to said second position and as said rotational drive device rotates said second lever arm, the first and second lever arms cooperate to rotate said first lever arm and said shaft to invert the workpiece.

14. The mechanism of claim 13, wherein said means for slidably engaging said first lever arm with said second lever arm includes a cam and cam follower arrangement.

15. The mechanism of claim 14, wherein said cam and cam follower arrangement includes a pin supported on said first lever arm and a slot disposed in said second lever arm, with said pin being engaged in said slot.

16. The mechanism of claim 13, wherein said means for urging said support member and said rotational drive device are both pneumatic drive devices.

17. The mechanism of claim 13, wherein adjustable stops are provided to limit the rotation of said shaft.

18. The mechanism of claim 13, wherein each time said rotational drive device is activated, said rotational drive device rotates in the opposite direction from its previous rotation.

19. The mechanism of claim 13, wherein a pair of sensors are provided to detect rotation of said second lever arm, and the outputs of said sensors are used to control the activation of said rotational drive device.

* * * * *